March 17, 1925.
D. C. MULVIHILL
COMBINED MUD HOOK AND AUTOMOBILE WHEEL LOCK
1,529,665
Filed May 1, 1922
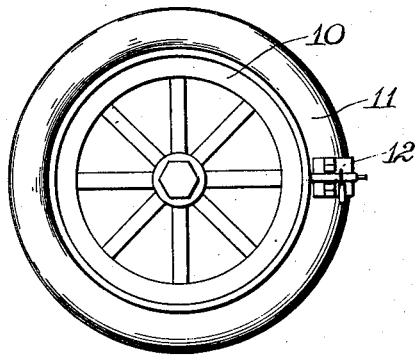
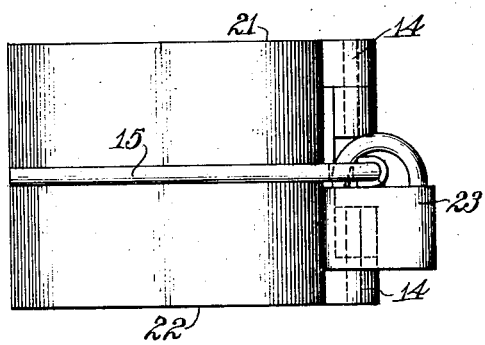
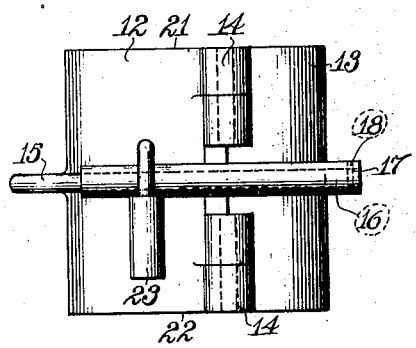
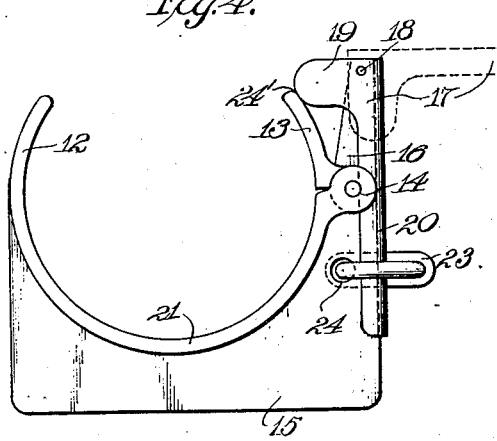
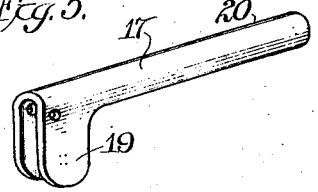
Inventor;
Daniel C. Mulvihill
By
his Att'ys.

Patented Mar. 17, 1925.

1,529,665

UNITED STATES PATENT OFFICE.

DANIEL C. MULVIHILL, OF HANNIBAL, MISSOURI.

COMBINED MUD HOOK AND AUTOMOBILE WHEEL LOCK.

Application filed May 1, 1922. Serial No. 557,635.

*To all whom it may concern:*

Be it known that I, DANIEL C. MULVIHILL, a citizen of the United States, and resident of Hannibal, county of Marion, and State of Missouri, have invented certain new and useful Improvements in Combined Mud Hooks and Automobile Wheel Locks, of which the following is a specification, and which are illustrated in the accompanying drawings, forming a part thereof.

The invention relates to a device which may be secured to a rear wheel of an automobile, or other motor vehicle, to serve as a traction tooth or mud hook, and which may also serve as a wheel lock, being then preferably secured to the front wheel of the vehicle.

The object of the invention is to provide a device adapted to the above uses which may be readily applied to a vehicle wheel of any type, whether of spoke or disk construction, and which may be fastened thereto by means of a suitable lock. More particularly, the object of the invention is to provide a device which may be clamped to the tire of a vehicle without the use of straps and buckles, and which may, if desired, be locked in the clamped position, thereby preventing theft of the car.

In the accompanying drawings illustrating the invention—

Fig. 1 is a side view of a vehicle wheel having the improved attachment secured thereto;

Fig. 2 is a rear view of the attachment;

Fig. 3 is a detail side view of the same, showing the clamping means;

Fig. 4 is a detail plan view of the device; and

Fig. 5 is a detail view of the clamping lever.

A vehicle wheel of ordinary construction is represented at 10, and is shown as provided with a pneumatic tire 11. When a particularly muddy spot is encountered and the ordinary anti-skid chain fails to prevent the rear wheels from spinning on the slippery surface, it is the present practice to employ a traction tooth or mud hook which is ordinarily secured to the wheel by means of straps buckled around the wheel rim between the spokes. The fitting of a mud hook of this kind to a vehicle wheel takes time, and furthermore, the device cannot be used on a wheel of the disk type.

According to the present invention my improved mud hook comprises a rim or shell of substantially semi-cylindrical form, 12, having a concave interior surface adapted to fit the tire 11, and is provided with an extension or flap 13, hinged thereto, as at 14, and adapted to be clamped against one side of the tire in any suitable manner. As shown, the traction element consists of a flat plate or fin 15, extending laterally from the surface of the rim or shell 12, and radially with respect to the tire 11, and located midway between the edges 21 and 22 of the shell 12. This fin may be provided with an extension 16 integral therewith and located on the same side as the flap 13. As shown, a clamping device 17, in the form of a bellcrank, is hinged to the outer end of the extension 16, as at 18, and comprises a cam 19 and operating lever 20. The clamp is preferably of channel shape, the side walls of the operating lever 20 being adapted to lap over the edge of the fin 15 when in the clamping position, as shown in full lines in Fig. 4.

The cam 19, as shown in Fig. 5, comprises a pair of ears rounded at their forward ends and adapted to engage the outer surface of the flap 13 to force the same against the tire 11, as the lever 20 is moved rearwardly from the dotted to the full line position (Fig. 4).

If it is desired to lock the attachment upon the tire this may be accomplished by securing the lever 20 against the edge of the fin 15 by means of a suitable lock 23, the hasp of which passes through an aperture 24 in the fin. It is evident that under such circumstances theft of the car is practically impossible, particularly if the attachment be secured to one of the front wheels of the vehicle.

When the device is used as a mud hook only the lock 23 is unnecessary, as there is no tendency for the clamp to come unfastened due to the fact that the pivot 18 of the clamp is beyond the point 24 at which the cam arm 19 bears against the surface of the flap 13 when in clamping position.

An illustrative embodiment of the device has been described with great particularity, but it is evident that the invention is not confined to the particular details described. The attachment may be cheaply and easily manufactured, and may be of any suitable material, as aluminum, brass, steel, or other metals. The fin 15 may be welded to the rim 12, or may be cast integral therewith, as is most convenient.

I claim as my invention—

1. In a device of the character described, in combination with a vehicle wheel, a substantially semi-cylindrical shell adapted to fit over the tire of the wheel, a flap hinged thereto, and means coacting between said shell and flap for clamping said flap against the tire.

2. In a device of the character described, in combination with a vehicle wheel, a shell adapted to fit over the tire of the wheel, a laterally projecting member rigid with said shell, a swinging member hinged to the shell, and means carried by said shell for clamping the hinged member against the tire.

3. A mud hook or the like comprising, in combination, a shell of substantially semi-cylindrical form, an axially swinging flap hinged thereto, a fin extending laterally from the outer surface of said shell, an arm integral with said fin and extending adjacent said flap, a clamp hinged to the outer end of said arm and comprising a bell-crank having a pivot arranged at right angles to the plane of said fin, the shorter arm of said crank being rounded and adapted to engage the outer surface of said flap.

4. A mud hook comprising a shell of substantially semi-cylindrical form adapted to fit over a vehicle tire, an axially swinging flap hinged to the shell, a fin extending laterally from the surface of the shell, an arm rigid with said shell, a clamping lever hinged to said arm having a cam arm adapted to engage the outer surface of said flap and movable in the plane of said fin.

5. In a device of the character described, in combination with the vehicle tire, a shell of substantially semi-cylindrical form, a fin extending laterally from said shell, an axially swinging flap hinged to the shell, and a clamping lever hinged to a portion of said fin adjacent the flap and movable in the plane of said fin.

6. In a device of the character described, in combination with a vehicle tire, a shell of substantially semi-cylindrical form, a traction element comprising a fin extending laterally from the shell and transversely thereto, a flap axially hinged to said shell, and means coacting between said shell and flap for clamping said flap against said tire.

7. A wheel lock for automobiles or the like comprising, in combination with a vehicle wheel, a shell adapted to fit over the tire, a laterally extending fin rigid with said shell, a single axially swinging member hinged to the shell, means for clamping the hinged member against the tire, and means for locking the same in clamped position.

8. A wheel lock for automobiles or the like comprising, in combination with a vehicle wheel, a shell of substantially semi-cylindrical form adapted to fit over the tire, a flap hinged thereto, a lever for clamping said flap against the tire, and a lock for engaging the free end of said lever for securing the same in clamped position.

9. A wheel lock for automobiles or the like comprising, in combination, a shell of substantially semi-cylindrical form, an axially swinging flap hinged thereto, a fin extending laterally from the outer surface of the shell, an arm extending from said fin adjacent said flap, a clamping lever hinged to said arm, and a lock for said lever, the hasp of the lock passing through an aperture in the fin.

10. A tire clamp comprising a curved body portion and a flap movably connected thereto, a radially extending fin carried by said body portion, means for forcing said flap toward said body portion, and a locking element for securing said means to said fin to hold said clamp in locked position.

11. In a device of the character described, in combination with a vehicle tire, a shell of substantially semi-cylindrical form having a concave interior surface adapted to fit over the periphery of the tire, an axially swinging flap hinged to and forming a continuation of said shell, and means mounted on said shell adjacent to said flap for clamping said flap against one side of the tire.

12. In a device of the character described, in combination with a vehicle tire, a shell adapted to fit over said tire comprising a plurality of flexibly joined sections, and clamping means having its fulcrum on one of said sections and one end adapted to compressibly engage another of said sections, said means being located wholly at one side of said tire when in clamping position.

13. In a device of the character described, in combination with a vehicle tire, a shell of substantially semi-cylindrical form having a concave interior surface adapted to fit over the tread of the tire, and a single axially swinging flap curved to conform to the curvature of the tire and forming a continuation of said shell, and means for clamping said flap against the side of the tire.

14. In a device of the character described, in combination with the vehicle tire, a sectional shell adapted to compressibly fit over said tire, a pin extending laterally from one of the said sections and provided with a rigid projection, and a clamping lever having its fulcrum on said projection and one end adapted to engage the outer surface of another section of the shell.

DANIEL C. MULVIHILL.